United States Patent [19]

Sado

[11] 4,445,027

[45] Apr. 24, 1984

[54] ELECTRONIC APPARATUS

[75] Inventor: Ichiro Sado, Tokyo, Japan

[73] Assignee: Canon Kabushiki Kaisha, Tokyo, Japan

[21] Appl. No.: 483,417

[22] Filed: Apr. 11, 1983

Related U.S. Application Data

[63] Continuation of Ser. No. 212,447, Dec. 3, 1980, abandoned.

[30] Foreign Application Priority Data

Dec. 20, 1979 [JP] Japan ................................ 54-164808

[51] Int. Cl.³ .............................................. G06C 9/60
[52] U.S. Cl. .................................... 235/430; 235/379
[58] Field of Search .............. 346/164, 365 E, 365 R; 235/145, 430, 379; 434/202

[56] References Cited

U.S. PATENT DOCUMENTS 3,483,553 12/1969 Blankenbaker ................ 235/145 R
4,126,949 11/1978 Simone ............................... 434/202

Primary Examiner—Harold I. Pitts
Attorney, Agent, or Firm—Fitzpatrick, Cella, Harper & Scinto

[57] ABSTRACT

An electronic apparatus is disclosed which comprises numeral input keys, plural unit input keys, a device for judging whether a combination of actuations of the numeral input keys and the unit input keys has a meaning as a figure, a device of forbidding the entry of the key signals of said combination in case said combination does not represent a meaning as a figure, and a device for generating an alarm signal simultaneously with the forbidding of said key signal entry.

2 Claims, 2 Drawing Figures

ELECTRONIC APPARATUS

This application is a continuation of application Ser. No. 212,447 filed Dec. 3, 1983, now abandoned.

BACKGROUND OF THE INVENTION

1. Field of the Invention

The present invention relates to an electronic apparatus such as an electronic calculator or teller's machine provided with monetary input keys for the digit units such as hundred or thousand. More particularly this invention relates to such apparatus capable, when a combination of actuations of numeral keys and said digit unit keys does not represent a meaningful figure, of forbidding the entry of key signals of said combination and giving a display for error.

2. Description of the Prior Art

There are already known electronic apparatus for arithmetic calculators such as electronic calculator or teller's machines, provided with digit unit input keys for entering the digit units such as hundred, thousand and million for assisting correct input of numbers. Certain digit units such as million and thousand are called absolute units which appear only once in a figure, while other units such as hundred and ten may appear plural times in a figure. For example "two hundred thousand two hundred" means "200200" and "two thousand two hundred" means "2200," but "two thousand hundred thousand" has no meaning and cannot be handled as a figure. Thus, in an electronic calculator or the like having digit unit input keys for thousand, hundred etc., it is desirable, in case the combination of the actuations of such digit unit keys does not represent a figure, to forbid the entry of key signals of said combination and to provide a display for an error.

SUMMARY OF THE INVENTION

The object of the present invention is to provide an electronic apparatus not characterized by the above-mentioned drawbacks and capable, in case the combination of actuations of numeral keys and digit unit input keys has no meaning as a figure, of forbidding the entry of key signals of said combination and providing a display for error.

DESCRIPTION OF THE PREFERRED EMBODIMENTS

The present invention will now be explained in detail by the following description to be taken in conjunction with the attached drawings.

In the following embodiment there are provided two digit unit input keys respectively for "ten thousand" and "thousand."

Figure 1:
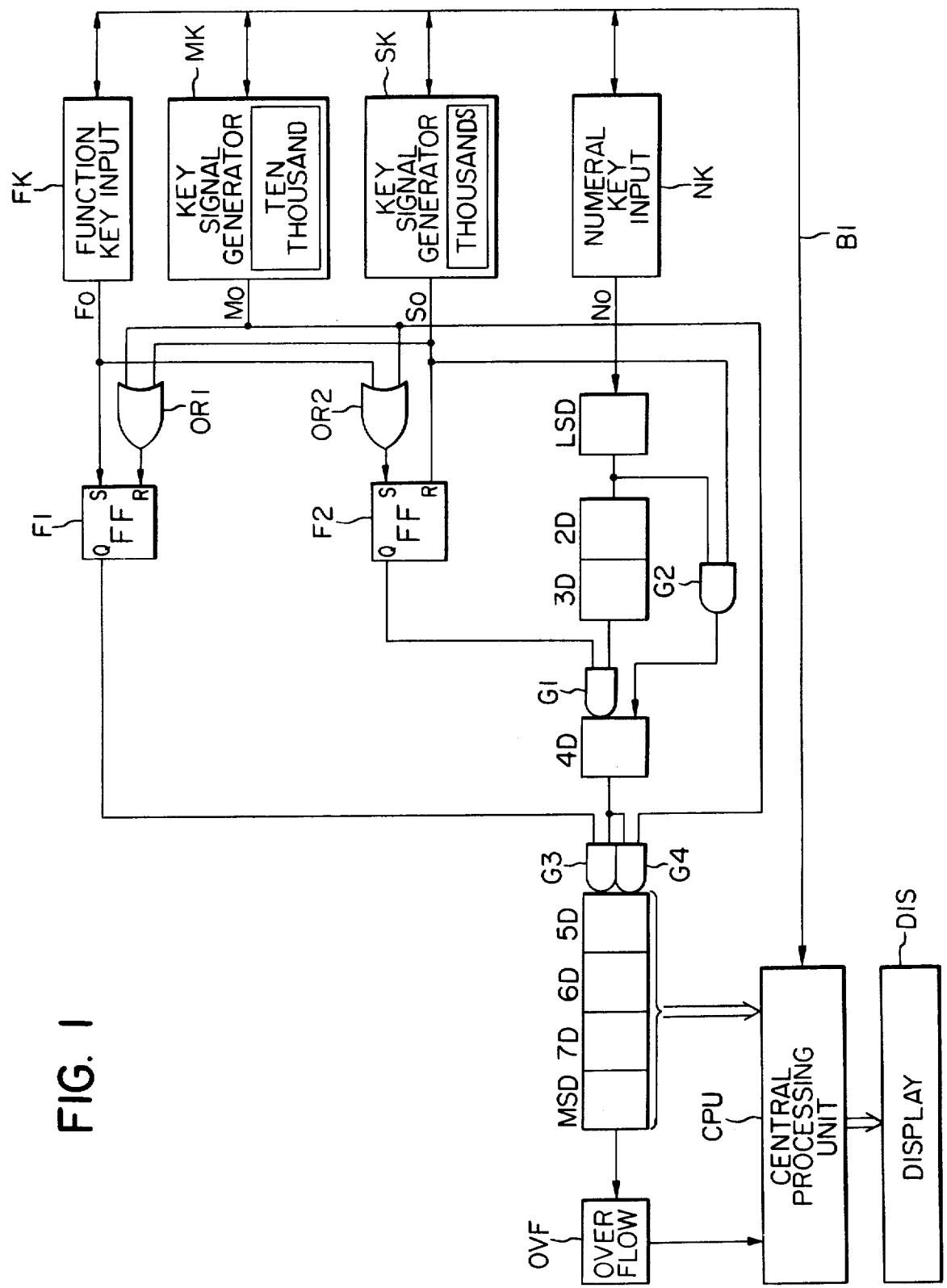
FIG. 1 is a block diagram showing an embodiment of the electronic apparatus of the present invention.

FIG. 1 shows, in a block diagram, an embodiment of the electronic apparatus of the present invention, wherein there are shown a function key input unit FK containing arithmetic operation keys such as "+", "−", "×", "÷" and a clear key "C" each of which generates a logic "1" signal $F_0$ for a determined period upon actuation; a key signal generator MK provided with a "ten thousand" key for entering a digit unit for ten thousand and capable of generating a logic "1" signal $M_0$ for a determined period upon actuation of said key; a key signal generator SK provided with a "thousand" key for entering a digit unit for thousand and capable of generating a logic "1" signal $S_0$ for a determined period upon actuation of said key; a numeral key input unit NK provided with numeral keys "0"–"9" and adapted to generate binary coded key signals $N_0$ in response to the actuations of said numeral keys; and a central processing unit CPU adapted for performing the arithmetic calculations and controlling various components in response to the signals supplied from the function key input unit FK, key signal generators MK, SK and numeral key input unit NK through a bus line $B_1$, and supplying display drive signals to a display unit DIS.

Also there are shown an OR gate $OR_1$ receiving key signals $M_0$ and $S_0$; an OR gate $OR_2$ receiving key signals $F_0$ and $M_0$; a flip-flop $F_1$ to be set by the logic "1" key signal $F_0$ supplied to the set terminal S and to be reset by a logic "1" output signal applied from the OR gate $OR_1$ to the reset terminal R; and a flip-flop $F_2$ to be set by a logic "1" output signal supplied from the OR gate $OR_2$ to the set terminal S and to be reset by the logic "1" key signal $S_0$ supplied to the reset terminal R. LSD, 2D through 7D, MSD and OVF constitute an 8-digit memory for successively storing the key signals $N_0$ generated in response to the actuation of the numeral key input unit NK, wherein LSD stores the least significant digit of the entered figure, 2D through 7D store the 2nd to 7th digits respectively, MSD stores the most significant digit and OVF stores the overflowing digit. Said 8-digit memory can be composed of a shift register, in which case the number stored in each digit is shifted in succession by the shift pulse supplied from the central processing unit CPU and cleared by a clear signal. Said 8-digit memory can also be composed of a random access memory, in which case the signal write-in and read-out are effected under the control of the central processing unit CPU.

In FIG. 1 there are further shown an AND gate G1 receiving the output signal from a memory 3D for storing the 3rd digit of the entered figure and an output signal Q from the flip-flop $F_2$ and adapted to read the number stored in said memory 3D in case of ordinary number entering operation without using the digit unit keys and in case the "ten thousand" key is actuated; and AND gate G2 receiving the output signal from the memory LSD for storing the least significant digit of the entered figure and the signal $S_0$ generated from the key signal generator SK in response to the actuation of the "thousand" key; an AND gate G3 receiving the output signal from the memory 4D for storing the 4th digit of the entered figure and an output signal Q from the flip-flop $F_1$ to read the number stored in said memory 4D in case of ordinary number entering operation without using the digit unit keys; and an AND gate G4 receiving the output signal from the memory 4D for storing the 4th digit of the entered figure and the signal $M_0$ generated from the key signal generator MK in response to the actuation of the "ten thousand" key.

Now there will be explained the function of the apparatus of the present invention.

In response to the actuation of the clear key "C" (not shown) in the function key input unit FK, a logic "1" signal $F_0$ is supplied directly to the set terminal S of the flip-flop $F_1$ and through the OR gate $OR_2$ to the set terminal S of the flip-flop $F_2$, whereby said flip-flops $F_1$, $F_2$ are set. Then, in response to the actuation of the key "1", the number "1" is stored in the memory LSD. Then, in response to the actuation of the "thousand" key, the key signal generator SK supplies the logic "1" signal $S_0$ to the AND gate $G_2$, whereby the number "1" stored in the memory LSD is transferred to the memory 4D through the AND gate $G_2$. Also said logic "1" signal $S_0$ is supplied to the reset terminals R of the flip-flops $F_1$, $F_2$, whereby said flip-flops are reset to shift the output signals Q to the logic "0" level.

Then, in case the "ten thousand" key is actuated, the key signal generator MK supplies the logic "1" signal $M_0$ through the OR gate $OR_2$ to set the flip-flop $F_2$, whereby the logic "1" output signal Q therefrom is supplied to the AND gate $G_1$. The logic "1" signal $M_0$ is also supplied to the AND gate $G_4$ for the aforementioned determined period, whereby the number "1" stored in the memory 4D is transferred through the AND gate $G_4$ and memories 5D, 6D and 7D to the memory MSD. Also the numbers "0" stored in the memories 3D, 2D and LSD are respectively transferred to the memories 7D, 6D and 5D through the AND gate $G_1$, memory 4D and AND gate $G_4$. In case the memories LSD through MSD are composed of a shift register, the central processing unit CPU generates 4-digit shift pulses in response to a signal supplied thereto through the bus line $B_1$ from the "ten thousand" key, whereby the contents of the shift register are respectively shifted by 4 digits. Also in case the memories LSD through MSD are composed of a random access memory, the addresses of the numbers stored in said random access memory are changed according to a control signal supplied from the central processing unit CPU in response to the actuation of said "ten thousand" key.

Thus, in case of entering a figure "10002000," at first the keys are actuated in the order of "1", "thousand" and "ten thousand" whereby the number "1" is stored in the memory MSD. Then the key "2" is actuated to store the number "2" in the memory LSD. Then, in response to the actuation of the "thousand" key, the logic "1" signal $S_0$ is supplied directly to the reset terminal R of the flip-flop $F_2$ and through the OR gate $OR_1$ to the reset terminal R of the flip-flop $F_1$ whereby the flip-flops $F_1$, $F_2$ are reset to supply logic "0" output signal Q to the AND gates $G_1$, $G_3$. Also the logic "1" signal $S_0$ is supplied also to the AND gate $G_2$, whereby the number "2" stored in the memory LSD is transferred through said AND gate $G_2$ to the memory 4D. In this manner the figure "10002000" is stored in the memories LSD through MSD in response to the key actuations in the order of "1", "thousand", "ten thousand," "2" and "thousand."

A case in which the keys "thousand" and "ten thousand" are actuated in a meaningless order is explained as follows. As explained in the foregoing, the clear key "C" is actuated at first to set the flip-flops $F_1$, $F_2$. Then the key "1" is actuated to stored the number "1" in the memory LSD. Then in response to the actuation of the "ten thousand" key, the logic "1" signal $M_0$ is supplied through the OR gate $OR_1$ to the reset terminal R of the flip-flop $F_1$ and also through the OR gate $OR_2$ to the set terminal S of the flip-flop $F_2$, whereby the flip-flop $F_1$ is reset to supply the logic "0" output signal Q to the AND gate $G_3$ while the flip-flop $F_2$ maintains the set state to supply the logic "1" output signal Q to the AND gate $G_1$. Said logic "1" signal $M_0$ is also supplied to the AND gate $G_4$, whereby the number "1" stored in the memory LSD is shifted under the conrol of the central processing unit CPU to the memory 3D and further transferred through the AND gates $G_1$, $G_4$ to the memory 5D. Then, in response to the successive actuations of the keys "2" and "thousand", the number "2" is stored in the memory 4D according to the procedure similar to that explained in the foregoing. In this state the content of the memories LSD through MSD is "xxx12000," wherein "x" stands for a blank code used for distinguishing a blank position from a zero input.

Then, in response to the actuation of the key "3," a number "3" is stored in the memory LSD. If the "ten thousand" key is actuated in this state, the number "3" stored in the memory LSD is transferred in the aforementioned manner by 4 digits through the memories 2D and 3D, AND gate $G_1$, memory 4D and AND gate $G_4$ to the memory 5D, whereby the number "1" originally stored in the memory 5D is likewise shifted by 4 digits to the overflow memory OVF. Detecting the storage of a code other than the blank code in said memory OVF, the central processing unit CPU identifies that the digit unit input keys are actuated in the meaningless order and supplies an error message signal to the display unit DIS to display an error message thereon, thus informing the operator of the error in the manipulation of the digit unit input keys.

Figure 2:
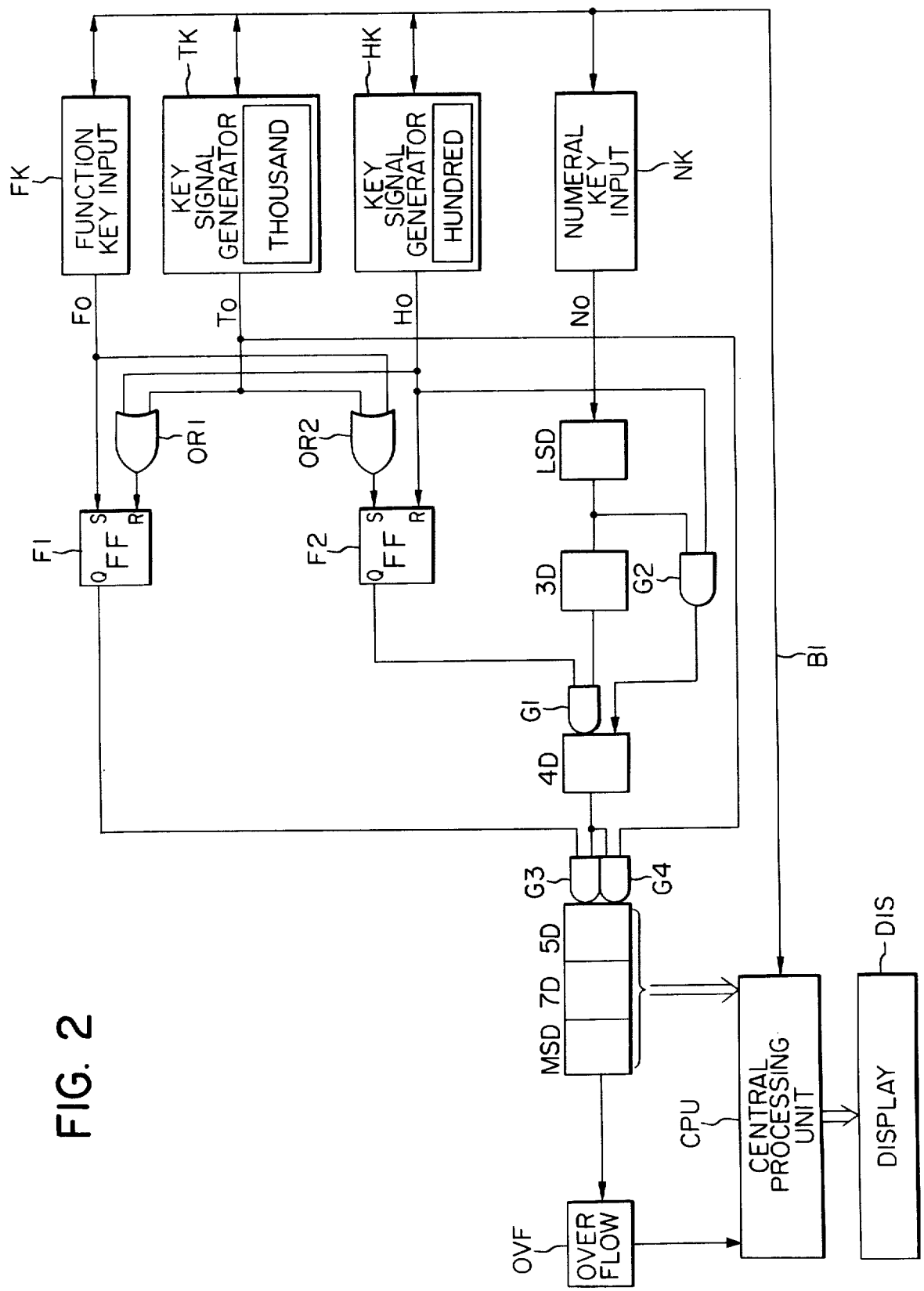
FIG. 2 is a block diagram showing another embodiment of the electronic apparatus of the present invention.

FIG. 2 shows another embodiment of the present invention which is provided with key signal generators TK, HK for keys T and H respectively representing thousand and hundred for the American or European way of counting, in place of the "ten thousand" key and "thousand" key shown in FIG. 1. The present embodiment lacks the memories 2D and 6D in FIG. 1, whereby the key T causes a shifting of 3 digits while the key H causes a shifting of 2 digits, both under the control of the central processing unit CPU. For example, in response to the key actuations in the order of "1", "H" and "T", the number "1" is stored in the memory MSD to display the figure "100000" in the aforementioned manner. On the other hand, in case the keys are actuated in the order of "1", "T" and "T", the memory OVF receives a code other than the bland code, whereby the central processing unit CPU supplies the error message signal to the display unit DIS to display an error message thereon.

As explained in the foregoing, the electronic apparatus of the present invention is adapted to accept the entry of a figure when the combination of actuations of plural digit unit input keys has a correct meaning but to prohibit the entry of said figure and to give an error message to the operator when said combination is meaningless, whereby the operator is given a chance to clear the erroneous input figure and reenter the correct figure, thus guided to the correct operations and correct results.

What I claim is:

1. An electronic apparatus comprising:
a plurality of numerical input keys for entering numerical data;
a plurality of monetary unit input keys for entering monetary unit data;
a first memory means for storing numerical data entered by said numerical input keys;
a second memory means for storing numerical data which overflows from said first memory means when monetary unit data is erroneously entered by at least one of said monetary unit input keys; and alarm means connected to said second memory means for generating an alarm signal in response to erroneous entry by at least one of said monetary unit input keys, causing numerical data to overflow into said second memory means, the alarm signal informing an operator of the erroneous input.

2. An electronic apparatus according to the claim 1 wherein said monetary unit input keys comprise a "thousand" key and a "hundred" key.

* * * * *